United States Patent [19]

Drent

[11] Patent Number: 5,106,952
[45] Date of Patent: Apr. 21, 1992

[54] CARBON MONOXIDE/NORBORNENE COPOLYMER HAVING SPIROKETAL STRUCTURAL UNITS

[75] Inventor: Eit Drent, Amsterdam, Netherlands

[73] Assignee: Shell Oil Company, Houston, Tex.

[21] Appl. No.: 520,304

[22] Filed: May 7, 1990

[30] Foreign Application Priority Data

May 24, 1989 [NL] Netherlands ............... 8901298

[51] Int. Cl.$^5$ ................................ C08G 67/02
[52] U.S. Cl. ........................... 528/392; 528/271
[58] Field of Search .................. 528/392, 271

[56] References Cited

U.S. PATENT DOCUMENTS

| | | | |
|---|---|---|---|
| 3,694,412 | 9/1972 | Nozaki | 260/63 CQ |
| 4,788,279 | 11/1988 | Drent | 528/392 |
| 4,960,857 | 10/1990 | Drent | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 229408 | 7/1987 | European Pat. Off. . |
| 257663 | 3/1988 | European Pat. Off. . |
| 345847 | 12/1989 | European Pat. Off. . |
| 351023 | 1/1990 | European Pat. Off. . |

*Primary Examiner*—Harold D. Anderson

[57] ABSTRACT

An improved process for the production of linear alternating polymers of carbon monoxide and norbornene-type compounds wherein substantially all of the moieties originating from the carbon monoxide are in a spiroketal structure which comprises contacting the carbon monoxide and norbornene compound in a liquid reaction diluent at a temperature below 55° C. in the presence of a catalyst composition formed from a compound of palladium, the anion of a non-hydrohalogenic acid having a pKa below 2, a bidentate ligand of nitrogen and an organic oxidant, the molar ratio of the bidentate ligand to the anion being at least 4.

4 Claims, No Drawings

CARBON MONOXIDE/NORBORNENE COPOLYMER HAVING SPIROKETAL STRUCTURAL UNITS

FIELD OF THE INVENTION

The present invention relates to a process for the production of linear alternating polymers of carbon monoxide and norbornene-type compounds of specified structure. More particularly, the invention relates to the production of such linear alternating copolymers wherein substantially all of the units derived from carbon monoxide are present in a spiroketal structure. The process employs, inter alia, a bidentate nitrogen ligand in at least a minimum quantity and a maximum reaction temperature.

BACKGROUND OF THE INVENTION

The class of linear alternating polymers of carbon monoxide and at least one ethylenically unsaturated hydrocarbon is known in the art. An early production of such polymers is disclosed by Nozaki. See, for example, U.S. Pat. No. 3,694,412. More recent processes for the production of such linear alternating polymers are disclosed in a number of published European Patent Applications including 121,965, 181,014, 213,671 and 257,663. In general, the latter processes employ a preferred catalyst composition formed from a compound of palladium, a strong non-hydrohalogenic acid having a pKa below 2 and a bidentate ligand of phosphorus or nitrogen. The polymeric product is typically of a structure represented by the repeating formula

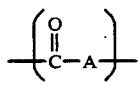 (I)

wherein A is the moiety of at least one ethylenically unsaturated hydrocarbon polymerized through the ethylenic unsaturation.

When the ethylenically unsaturated hydrocarbon to be polymerized is cyclic in structure, particularly polycyclic in structure, it is often advantageous to use a catalyst composition wherein the bidentate ligand is a bidentate ligand of nitrogen. In U.S. Pat. No. 4,788,279 there is disclosed a process for the production of linear alternating polymers of carbon monoxide and norbornene or dicyclopentadiene. The production of linear alternating polymers of carbon monoxide and substituted norbornene compounds is described in copending U.S. patent application Ser. No. 379,839, filed Jul. 14, 1989. The type of polymer product resulting from such polymerizations will vary, however, with the type of ethylenically unsaturated cyclic hydrocarbon.

In the case of polymers of carbon monoxide and norbornene compounds which are produced according to the above procedures, typically employing reaction temperatures above 60° C. and relatively high ratios of bidentate ligand to acid anion in the catalyst composition, the structure of the polymers is generally in accord with the above formula I. In the case of the polymers of carbon monoxide and dicyclopentadiene, however, the polymers are linear and alternating but have a structure in which the moieties originating from carbon monoxide are predominantly in a spiroketal structure of the general formula

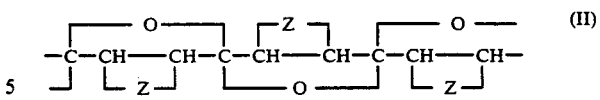

wherein Z represents the remainder of the dicyclopentadiene molecule other than the two carbon atoms of the ethylenic unsaturation in the 5- and 6-ring positions. The monoolefinic materials such as norbornene or 2,3-di-substituted norbornene will have less than about 25% of the moieties originating from carbon monoxide in the spiroketal structure of formula II and more than about 75% in the ketone structure of formula I. The diolefinic compounds such as dicyclopentadiene form linear alternating polymers with carbon monoxide in which more than 75% of the moieties originating from carbon monoxide are of the spiroketal structure represented by formula II. For some purposes it may be desirable to have a linear alternating polymer of carbon monoxide and a norbornene compound of the nature of formula II with a high proportion of spiroketal units. It would therefore be of advantage to provide a process for the production of linear alternating polymers of carbon monoxide and norbornene compounds in which a higher proportion of the moieties originating or derived from the carbon monoxide are in a spiroketal structure.

SUMMARY OF THE INVENTION

The present invention provides an improved process for the production of linear alternating polymers of carbon monoxide and norbornene-type compound in which a high proportion of the moieties derived from carbon monoxide are present in a spiroketal structure. More particularly, the present invention provides an improved process of particular reaction temperature and catalyst composition in which the polymerization of carbon monoxide and these norbornene compounds provides a linear alternating polymer in which substantially all the moieties resulting from the carbon monoxide are present in a spiroketal structure.

DESCRIPTION OF THE INVENTION

The process of the invention comprises contacting carbon monoxide and norbornene-type compound in a reaction diluent under polymerization conditions which include a polymerization temperature no greater than about 55° C. and in the presence of a catalyst composition formed from a compound of palladium, the anion of a non-hydrohalogenic acid having a pKa below 2, a bidentate ligand of nitrogen and an organic oxidant. The mixture from which the catalyst composition is formed has more than 4 moles of the bidentate ligand per mole of anion.

The norbornene compound monomers useful in the polymerization process are characterized by having up to 20 carbon atoms and by a six-membered carbocyclic ring in which the carbon atoms 1 and 4 are connected by an oxygen atom or a carbon atom and the 5 and 6 carbon atoms are connected by a carbon-carbon double bond. The preferred norbornene compounds are represented by the formula

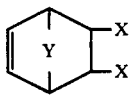

wherein Y is oxygen or —CR$_2$— in which R independently is hydrogen or lower alkyl of up to 4 carbon atoms, particularly methyl. The term X independently is -R, hydroxy substituted-R, carboxy or carboalkoxy, or the two X groups taken together form a carboxylic acid anhydride moiety, i.e.,

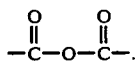

Illustrative of such norbornene compounds are norbornene, bornene, 3-methylnorbornene-2-carboxylic acid, norbornene-2,3-dicarboxylic acid, norbornene-2,3-dicarboxylic acid anhydride, 2-(hydroxymethyl)norbornene and 1,4-endoxo-5-cyclohexene. The preferred norbornene compounds are those of the above formula III wherein Y is —CH$_2$— and particularly preferred is norbornene.

The catalyst composition which is employed in the process of the invention is formed from a compound of palladium, an anion of a non-hydrohalogenic acid having a pKa below 2, a bindentate ligand of nitrogen in specified quantity relative to the anion and an organic oxidant. The palladium compound is preferably a palladium alkanoate and palladium alkanoates such as palladium acetate, palladium propionate, palladium butyrate and palladium octanoate are satisfactory. The use of palladium acetate is particularly preferred. The anion component is the anion of a non-hydrohalogenic acid having a pKa (measured in water at 18° C.) below 2. Suitable anions include anions of inorganic acids such as sulfuric acid and perchloric acid and anions of organic acids including carboxylic acids such as trifluoroacetic acid, trichloroacetic acid and dichloroacetic acid as well as sulfonic acids such a p-toluenesulfonic acid, methanesulfonic acid and trifluoromethanesulfonic acid. Anions of trifluoroacetic acid or p-toluenesulfonic acid are a preferred class of anions from which the catalyst compositions of the invention are formed. The anion is preferably provided as the free acid but it is also useful on occasion to provide the anion as a metal salt, particularly a non-noble transition metal salt such as the copper salt or the nickel salt. In yet another modification the palladium and the anion are provided as a single compound, e.g., palladium p-toluenesulfonate. However provided, the anion is employed in an amount from about 1 mole to about 100 moles, per mole of palladium present.

The bidentate ligand of nitrogen is a compound containing two nitrogen atoms and up to 20 carbon atoms inclusive of the general formula

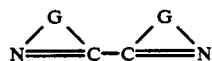

wherein G independently is an organic bridging group of up to 9 carbon atoms inclusive with from 3 to 4 atoms in the bridge at least two of which are carbon atoms and any other atoms are nitrogen atoms. Illustrative of suitable bidentate nitrogen ligands are the bipyridines such as 2,2'-bipyridine and 4,4'-dimethyl-2,2'-bipyridine, the 1,10-phenanthrolines such as 1,10-phenanthroline and 4,7-dimethyl-1,10-phenanthroline, 2,2'-biquinoline and 2-(2-pyridyl)benzimidazole. The preferred bidentate nitrogen ligands are 2,2'-bipyridine and 1,10-phenanthroline. The bidentate ligand is provided in a quantity of from about 4 moles to about 4000 moles, preferably from about 4 moles to about 400 moles, per mole of palladium but in a molar quantity more than 4 times that of the anion, preferably at least 4.5 times the molar quantity of the anion. A quantity of nitrogen bidentate ligand of at least 5 moles of ligand per mole of anion is particularly preferred.

The mixture from which the catalyst composition is formed also contains an organic oxidant. Suitable organic oxidants include the quinones, both 1,2-quinones and 1,4-quinones, aliphatic nitrite compounds such as butyl nitrite, and aromatic nitro compounds such as nitrobenzene and 2,4-dinitrotoluene. Preferred organic oxidants are 1,4-benzoquinone, nitrobenzene and 2,4-dinitrotoluene. The organic oxidant is provided to the catalyst composition mixture in a quantity from about 1 mol to about 10,000 mols, preferably from about 10 mols to about 5000 mols, per mol of palladium.

The carbon monoxide and the norbornene compound are contacted in a reaction diluent under polymerization conditions in the presence of a catalytic amount of the catalyst composition. Suitable reaction diluents include alkanols such as methanol and ethanol. Methanol is preferred. The polymerization is conducted in liquid phase at a reaction temperature below 55° C. Reaction temperatures below 50° C. are preferred and reaction temperatures below 45° C. are particularly preferred. Although reaction temperatures below ambient temperature are suitable so long as the reaction mixture is liquid, the reaction temperature will typically be at or above ambient temperature. Suitable reaction pressures are from about 2 bar to about 150 bar, preferably from about 35 bar to about 100 bar. The quantity of catalyst to be used is sufficient to provide from about $1 \times 10^{-7}$ mole to about $1 \times 10^{-3}$ mole per mole of norbornene compound to be polymerized, particularly from about $1 \times 10^{-6}$ mole to about $1 \times 10^{-4}$ mole of palladium per mole of norbornene compound. The molar ratio of norbornene compound to carbon monoxide in the polymerization mixture is from about 10:1 to about 1:10 but preferably is from about 5:1 to about 1:5.

The contacting of the monomeric reactants and the catalyst composition takes place under polymerization conditions in the reaction diluent in a suitable reactor. The contacting is facilitated by supplying agitation such as shaking or stirring. Subsequent to the polymerization the reaction is terminated as by cooling the reactor and contents and by releasing the pressure. The polymer product is typically obtained as a material substantially insoluble in the product mixture and is recovered by conventional methods such as filtration or decantation. The polymer is used as such or is purified as by contact with a solvent or a complexing agent which is selective for the catalyst residues.

The polymeric polymers are linear alternating polymers of the formula II type wherein the

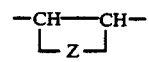

moieties represent the norbornene compound reactant of formula III polymerized through the ethylenic unsaturation and wherein substantially all the moieties originating from the carbon monoxide are present in the indicated spiroketal structure. The polymers are thermoplastic polymers and are processed by methods conventional for thermoplastic polymers, e.g., extrusion, injection molding or thermoforming, into shaped articles of established utility. Specific applications include the production of containers for food and drink and the formation of housings and parts for automotive applications.

The invention is further illustrated by the following Comparative Examples (not of the invention) and the following Illustrative Embodiments which should not be regarded as limiting. The polymer product of Comparative Example I was examined by $^{13}$C-NMR analysis and found to be of a linear alternating structure with more than 75% of the moieties originating from carbon monoxide present in a ketone structure. The polymer products of the Illustrative Embodiments and Comparative Example II were also examined by $^{13}$C-NMR analysis. It was found that each product had a linear alternating structure and that substantially all the moieties originating from carbon monoxide were present in a spiroketal structure.

ILLUSTRATIVE EMBODIMENT I

A copolymer of carbon monoxide and norbornene was prepared by charging to an autoclave of 250 ml capacity equipped with a mechanical stirrer a catalyst composition solution comprising 50 ml of methanol, 0.1 mmol palladium acetate, 0.5 mmol p-toluenesulfonic acid, 3 mmol 2,2'-bipyridine and 30 mmol 2,4-dinitrotoluene. After 20 ml of norbornene was introduced into the autoclave, carbon monoxide was added until a pressure of 40 bar was reached. The contents of the autoclave were then heated to 40° C. After 5 hours the polymerization was terminated by cooling the autoclave and contents to room temperature and releasing the pressure. The copolymer product was recovered by filtration, washed with methanol and dried. The yield of copolymer was 22.6 g.

ILLUSTRATIVE EMBODIMENT II

A copolymer of carbon monoxide and 2-(hydroxymethyl)norbornene was produced by a procedure substantially similar to that of Illustrative Embodiment I except that the catalyst composition solution contained 20 mmol of 1,4-benzoquinone instead of 2,4-dinitrotoluene, 10 g of 2-(hydroxymethyl)norbornene were introduced instead of norbornene, and the reaction temperature was 25° C. instead of 40° C. The yield of copolymer was 12.5 g.

ILLUSTRATIVE EMBODIMENT III

A copolymer of carbon monoxide and 2-(hydroxymethyl)norbornene was produced by a procedure substantially similar to that of Illustrative Embodiment II except that the catalyst composition solution contained 30 mmol of nitrobenzene instead of 1,4-benzoquinone and the reaction temperature was 40° C. instead of 25° C. The yield of copolymer was 13 g.

COMPARATIVE EXAMPLE I

A copolymer of carbon monoxide and norbornene was produced by a procedure substantially similar to that of Illustrative Embodiment I except that a) the catalyst composition solution contained 10 ml instead of 50 ml of methanol, 2 mmol instead of 0.5 mmol p-toluenesulfonic acid and 20 mmol of 1,4-benzoquinone instead of 2,4-dinitrotoluene, b) the quantity of norbornene introduced was 30 ml instead of 20 ml, c) the reaction temperature was 90° C. instead of 40° C., and d) the reaction time was 2 hours instead of 5 hours.

The yield of copolymer was 26 g.

COMPARATIVE EXAMPLE II

A copolymer of carbon monoxide and dicyclopentadiene was produced by a procedure substantially similar to that of Illustrative Embodiment I except that the catalyst composition solution contained 60 mmol instead of 30 mmol of 2,4-dinitrotoluene, 20 ml of dicyclopentadiene were introduced instead of norbornene and the reaction temperature was 60° C. instead of 40° C. The yield of copolymer was 20 g.

What is claimed is:

1. A linear alternating polymer of carbon monoxide and a norbornene compound prepared at a polymerization temperature below 55° C. and represented by the repeating formula

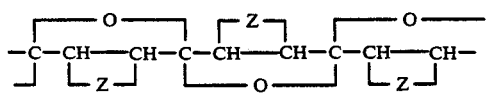

wherein more than 75% of the moieties resulting from the carbon monoxide are present in a spiroketal structure, and wherein

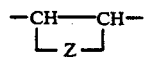

moieties represent the norbornene compound polymerized through the ethylenic unsaturation between the carbon atoms in the 5- and 6-ring positions, and Z represents the remainder of the norbornene compound other than the two carbon atoms in the 5- and 6-ring positions.

2. The polymer of claim 1 wherein the

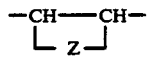

represents the norbornene compound

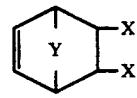

wherein Y is oxygen or —CR$_2$— in which R independently is hydrogen or lower alkyl and X independently is H, lower alkyl, or hydroxy alkyl, the norbornene compound being polymerized through the ethylenic unsaturation.

3. The polymer of claim 2 wherein the Y of the norbornene compound is —CH$_2$—.

4. The polymer of claim 3 wherein the norbornene compound is norbornene.

* * * * *